United States Patent
Lee et al.

(10) Patent No.: US 8,611,364 B2
(45) Date of Patent: Dec. 17, 2013

(54) UNIVERSAL SERIAL BUS CONTROL SYSTEM AND METHOD OF DRIVING THE SAME

(75) Inventors: KyuMan Lee, Suwon-si (KR); YunYoung Kim, Hwaseong-si (KR); Jinyong Chung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 517 days.

(21) Appl. No.: 12/797,890

(22) Filed: Jun. 10, 2010

(65) Prior Publication Data

US 2011/0010477 A1  Jan. 13, 2011

(30) Foreign Application Priority Data

Jul. 7, 2009  (KR) .................. 10-2009-0061744

(51) Int. Cl.
*H04J 4/00* (2006.01)
*H04L 5/26* (2006.01)

(52) U.S. Cl.
CPC .... *H04J 4/00* (2013.01); *H04L 5/26* (2013.01)
USPC .......................................................... 370/436

(58) Field of Classification Search
USPC ................. 370/310, 338, 436; 710/16, 18
See application file for complete search history.

(56) References Cited

U.S. PATENT DOCUMENTS

| | | | |
|---|---|---|---|
| 2002/0159434 A1* | 10/2002 | Gosior et al. | 370/350 |
| 2004/0073727 A1 | 4/2004 | Moran et al. | |
| 2004/0203537 A1* | 10/2004 | Yoshida et al. | 455/90.3 |
| 2007/0073935 A1* | 3/2007 | Kim et al. | 710/62 |
| 2007/0213091 A1* | 9/2007 | Kimura | 455/553.1 |
| 2008/0117886 A1* | 5/2008 | Kim et al. | 370/338 |
| 2008/0162741 A1* | 7/2008 | Christison et al. | 710/18 |
| 2008/0310318 A1* | 12/2008 | Bang et al. | 370/252 |

FOREIGN PATENT DOCUMENTS

| | | |
|---|---|---|
| JP | 2007-243236 | 9/2007 |
| KR | 100745694 | 7/2007 |
| WO | 2008008040 | 1/2008 |

* cited by examiner

*Primary Examiner* — Pao Sinkantarakorn
*Assistant Examiner* — Richard K Chang
(74) *Attorney, Agent, or Firm* — F. Chau & Associates, LLC

(57) ABSTRACT

A universal serial bus (USB) control system includes a plurality of antennas configured to transmit and receive a radio frequency (RF) signal, a plurality of wireless USB modules connected to the plurality of antennas, and an application layer connected to the plurality of wireless USB modules. Each wireless USB module is configured to convert the RF signal received through a corresponding antenna into data, convert the data into the RF signal, and transmit the RF signal through the corresponding antenna.

14 Claims, 11 Drawing Sheets

Fig. 6A

| TFC | Frequency Band ID | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |
| 8 | 1 | 2 | 1 | 2 | 1 | 2 |
| 9 | 1 | 3 | 1 | 3 | 1 | 3 |
| 10 | 2 | 3 | 2 | 3 | 2 | 3 |

Fig. 6B

| TFC | Frequency Band ID | | | | | |
|---|---|---|---|---|---|---|
| 1 | 4 | 5 | 6 | 4 | 5 | 6 |
| 2 | 4 | 6 | 5 | 4 | 6 | 5 |
| 3 | 4 | 4 | 5 | 5 | 6 | 6 |
| 4 | 4 | 4 | 6 | 6 | 5 | 5 |
| 5 | 4 | 4 | 4 | 4 | 4 | 4 |
| 6 | 5 | 5 | 5 | 5 | 5 | 5 |
| 7 | 6 | 6 | 6 | 6 | 6 | 6 |
| 8 | 4 | 5 | 4 | 5 | 4 | 5 |
| 9 | 4 | 6 | 4 | 6 | 4 | 6 |
| 10 | 5 | 6 | 5 | 6 | 5 | 6 |

20 # UNIVERSAL SERIAL BUS CONTROL SYSTEM AND METHOD OF DRIVING THE SAME

CROSS-REFERENCE TO RELATED APPLICATIONS

This U.S. non-provisional patent application claims priority under 35 U.S.C. §119 to Korean Patent Application No. 10-2009-0061744 filed on Jul. 7, 2009, the disclosure of which is incorporated by reference herein in its entirety.

BACKGROUND

1. Technical Field

The present invention relates to a universal serial bus (USB) control system and a method of driving the same, and more particularly, to a USB control system using a plurality of wireless USB modules and a method of driving the USB control system.

2. Discussion of the Related Art

Different protocols for establishing a network connection between short-distance electronic devices such as various audio/video (A/V) devices, personal computers and portable phones, are currently being developed. For example, a wireless LAN using a 2.4 GHz band and a 5 GHz band, and Bluetooth using a 2.4 GHz band may be used to establish a network connection between such electronic devices.

Short-distance wireless techniques, such as an ultra wide band (UWB) technique, may be utilized to support high speed transmission between electronic devices. A UWB technique may utilize a frequency band of about 3.1 GHz to about 10.6 GHz.

Because wireless communication techniques such as a UWB technique eliminates wires and cables, wireless communication techniques are currently being developed for use with universal serial bus (USB) systems. However, implementing a wireless technique for USB systems results in a lower data transfer speed when compared to a wired USB system.

SUMMARY

According to an exemplary embodiment of the inventive concept, a universal serial bus (USB) control system includes a plurality of antennas configured to transmit and receive a radio frequency (RF) signal, a plurality of wireless USB modules connected to the plurality of antennas, and an application layer connected to the plurality of wireless USB modules. Each wireless USB module is configured to convert the RF signal received through a corresponding antenna into data, convert the data into the RF signal and transmit the RF signal through the corresponding antenna.

In an exemplary embodiment, the application layer includes a controller, a frequency allocating unit, a data converting unit, and a switching unit. The frequency allocating unit is configured to allocate different frequency bands to the plurality of wireless USB modules in response to a first control signal received from the controller. The data converting unit is configured to convert received serial data into parallel data and convert received parallel data into serial data in response to a second control signal received from the controller. The switching unit is configured to set the plurality of wireless USB modules to a transmitting mode or a receiving mode. While in the transmitting mode, the plurality of wireless USB modules are configured to transmit the parallel data to a client device. While in the receiving mode, the plurality of wireless USB modules are configured to receive the parallel data from the data converting unit.

In an exemplary embodiment, the USB control system includes a lookup table configured to store reference channel information corresponding to the plurality of wireless USB modules, and a channel searching unit configured to receive channel information from a client device, and output channel selection information by comparing the channel information with the reference channel information. The controller is configured to select available wireless USB modules from the plurality of wireless USB modules based on the channel selection information.

In an exemplary embodiment, the frequency allocating unit is configured to allocate different time-frequency codes (TFCs) to the plurality of wireless USB modules.

In an exemplary embodiment, the data converting unit is configured to parse the received serial data into a number of groups corresponding to the plurality of wireless USB modules.

In an exemplary embodiment, each of the plurality of wireless USB modules includes an RF unit connected to the corresponding antenna, configured to convert the RF signal into a baseband signal, a physical layer configured to encode and decode the converted baseband signal, and a media access control (MAC) layer configured to control a flow of the data.

In an exemplary embodiment, the MAC layer is configured to prevent data packet collision.

In an exemplary embodiment, the USB control system includes a USB cable configured to transmit and receive data, a wired USB module configured to process the data received through the USB cable, transmit the processed data to the application layer, and transmit the processed data to the USB cable, and a detection block connected to the USB cable configured to detect a connection state of the USB cable and transmit a detection signal to the controller.

In an exemplary embodiment, the application layer is configured to determine whether to transmit the data through the USB cable in response to the detection signal received from the detection block.

In an exemplary embodiment, the wired USB module includes a physical layer configured to encode and decode the data and a media access control (MAC) layer configured to control a flow of the data.

In an exemplary embodiment, the MAC layer is configured to prevent data collision.

According to an exemplary embodiment of the inventive concept, a method of driving a USB control system includes detecting a plurality of wireless USB modules at a host device and at a client device, allocating different frequency bands to the plurality of wireless USB modules at the host device upon detecting the plurality of wireless USB modules at the host and client devices, receiving serial data through the plurality of wireless USB modules at the host device, converting the received serial data into parallel data, and transmitting the parallel data through the plurality of wireless USB modules at the host device to the plurality of wireless USB modules at the client device.

In an exemplary embodiment, the method further includes determining whether a USB cable at the host device is connected to the client device. If it is determined that the USB cable is not connected to the client device, data is transmitted only through the plurality of wireless USB modules at the host and client devices. If it is determined that the plurality of wireless USB modules at the host and client devices and a wired USB module at the host and client devices are simultaneously used, data is transmitted through the plurality of wireless USB modules at the host and client devices and through the USB cable. If it is determined that the plurality of wireless USB modules at the host and client devices and the wired USB module at the host and client devices are not to be used simultaneously, data is transmitted through only the USB cable.

In an exemplary embodiment, allocating the different frequency bands to the plurality of wireless USB modules at the host device includes allocating different time-frequency codes (TFCs) to the plurality of wireless USB modules at the host device. The different frequency bands do not overlap.

According to an exemplary embodiment of the inventive concept, a USB control system includes a host device and a client device. The host device includes a first plurality of antennas configured to transmit and receive a radio frequency (RF) signal, a first plurality of wireless USB modules connected to the first plurality of antennas, wherein each wireless USB module is configured to convert the RF signal received through a corresponding antenna into data, and is configured to convert the data into the RF signal and transmit the RF signal through the corresponding antenna, and a first application layer connected to the first plurality of wireless USB modules. The client device includes a second plurality of antennas configured to transmit and receive the radio frequency (RF) signal, a second plurality of wireless USB modules connected to the second plurality of antennas, wherein each wireless USB module is configured to convert the RF signal received through a corresponding antenna into data, and is configured to convert the data into the RF signal and transmit the RF signal through the corresponding antenna, and a second application layer connected to the second plurality of wireless USB modules. The data is transferred between the first plurality of wireless USB modules of the host device and the second plurality of wireless USB modules at the client device.

In an exemplary embodiment, the client device includes a solid state drive (SSD).

In an exemplary embodiment, the USB control system includes a first wired
USB module at the host device, a second wired USB module at the client device, and a USB cable connected to the first wired USB module and the second wired USB module. The data is transferred between the first and second wired USB modules through the USB cable.

BRIEF DESCRIPTION OF THE DRAWINGS

The above and other features of the present invention will become more apparent by describing in detail exemplary embodiments thereof with reference to the accompanying drawings in which:

FIG. 6A illustrates a first table of a time-frequency code (TFC) with respect to a first band group;

FIG. 6B illustrates a second table of a time-frequency code (TFC) with respect to a second band group;

DETAILED DESCRIPTION OF THE EMBODIMENTS

Figure 1:
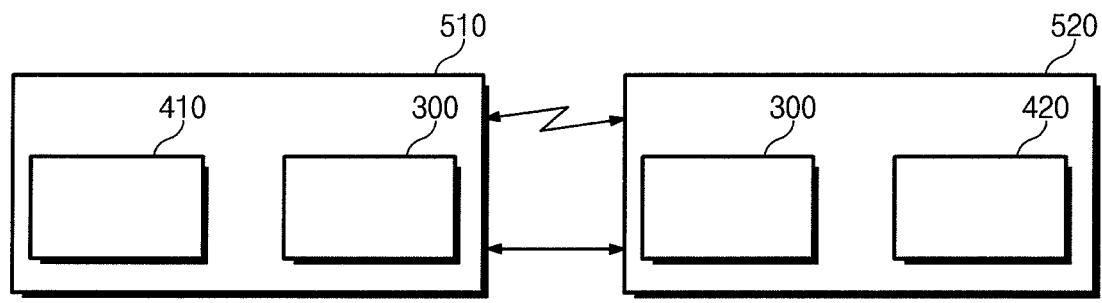
FIG. 1 is a block diagram illustrating a host and a client according to an exemplary embodiment of the inventive concept.

Exemplary embodiments of the present invention will be described more fully hereinafter with reference to the accompanying drawings.

The present invention may, however, be embodied in many different forms and should not be construed as limited to the embodiments set forth herein. Like reference numerals refer to like elements throughout the accompanying drawings.

FIG. 1 is a block diagram illustrating a host and a client according to an exemplary embodiment of the present invention.

Referring to FIG. 1, a host 510 includes a host controller 410 and a universal serial bus (USB) control system 300. A client 520 such as, for example, a solid state drive (SSD), includes a client controller 420 and a USB control system 300.

The host 510 may be any type of device that utilizes an external storage device such as, for example, a personal computer, a camera, a video camcorder, an electronic organizer, an MP3 player, or a personal digital assistant (PDA). In addition to being connected to the client 520, the host 510 may further be connected to another external storage device.

A USB control system 300 is implemented in each of the host 510 and the client 520. Because each USB control system 300 has the same configuration, hereinafter, the inventive concept will be described with reference to the USB control system 300 in the host 510.

Figure 2:
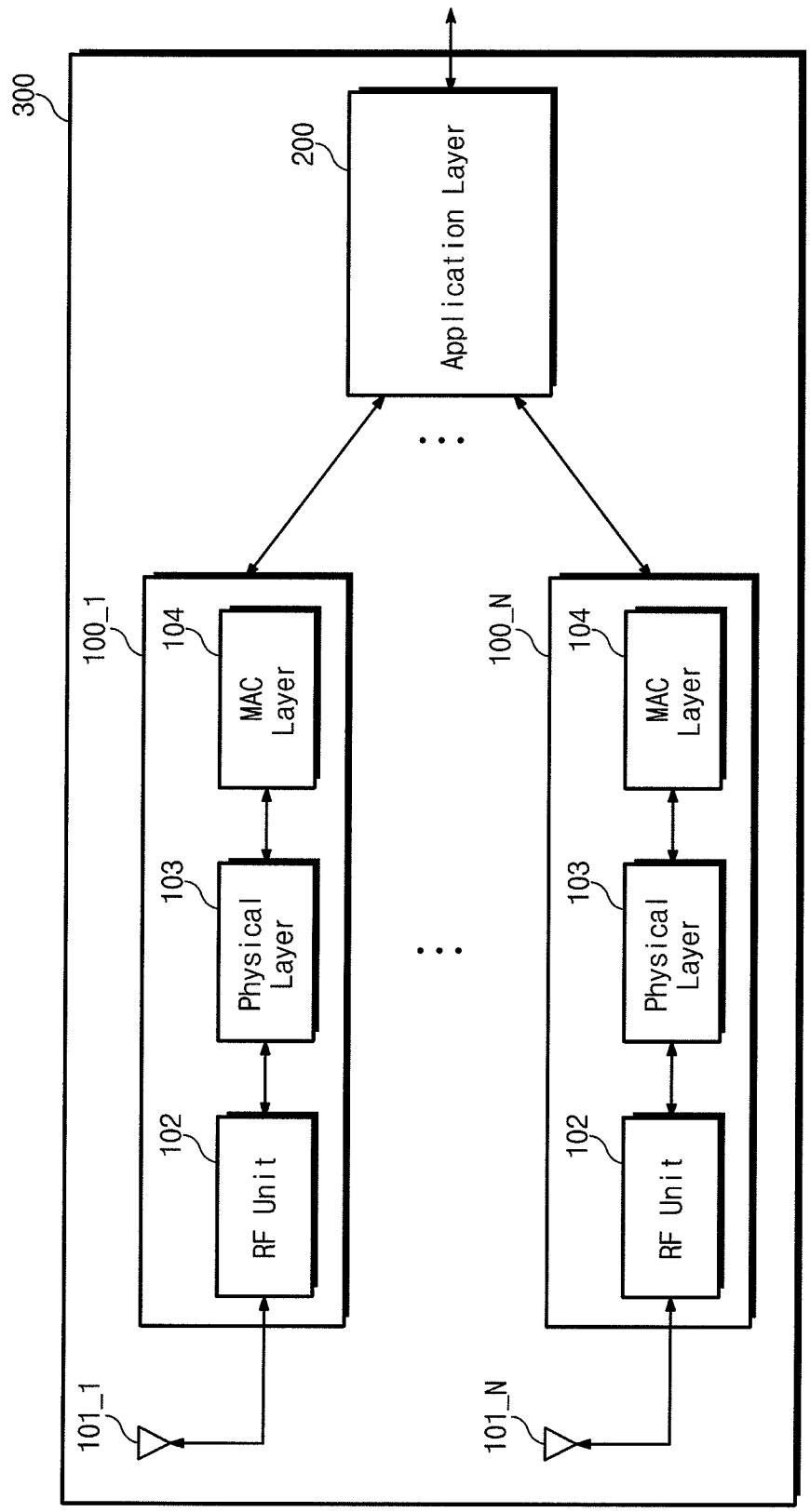
FIG. 2 is a block diagram illustrating a USB control system according to an exemplary embodiment of the inventive concept.
Figure 3:
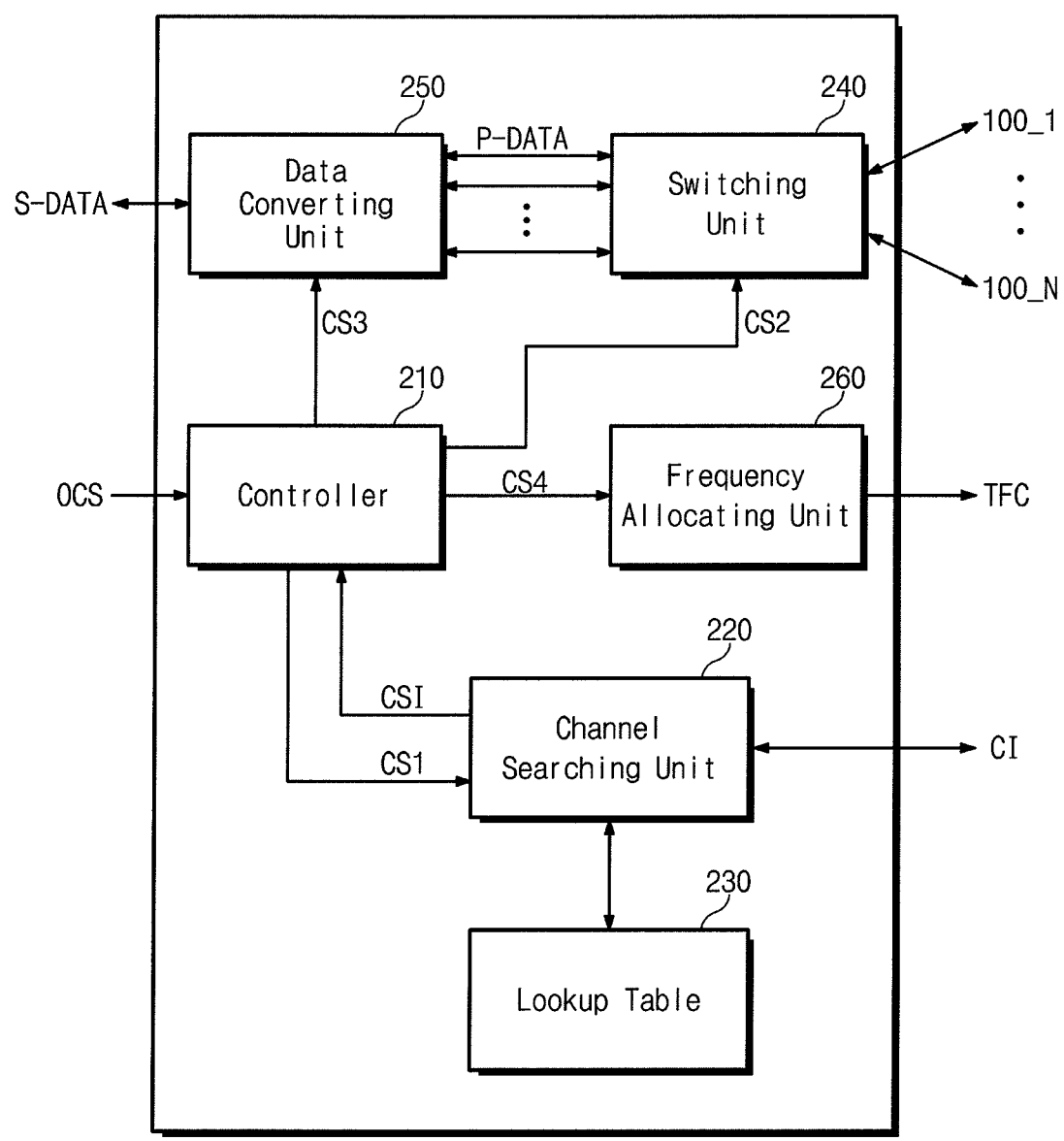
FIG. 3 is a block diagram of an application layer shown in FIG. 2.

FIG. 2 is a block diagram illustrating a USB control system according to an exemplary embodiment of the present invention. FIG. 3 is a block diagram of an application layer shown in FIG. 2 according to an exemplary embodiment of the present invention.

Referring to FIG. 2, the USB control system 300 includes N antennas 101_1 to 101_N, N wireless USB modules 100_1 to 100_N corresponding to the N antennas 101_1 to 101_N, respectively, and an application layer 200.

Each of the antennas 101_1 to 101_N transmit a radio frequency (RF) signal to the USB control system 300 at the client 520, or receives an RF signal from the USB control system 300 at the client 520. Each of the antennas 101_1 to 101_N may be integrated into the host 510 or may be separate from and connected to the host 510.

Each of the N wireless USB modules 100_1 to 100_N is connected to a corresponding antenna of the N antennas 101_1 to 101_N and converts an RF signal received through the corresponding antenna into data, or converts data to be transmitted through the corresponding antenna into an RF signal.

Each of the wireless USB modules 100_1 to 100_N includes an RF unit 102, a physical layer 103, and a media access control (MAC) layer 104. The RF unit 102 converts the RF signal received through the corresponding antenna into a baseband signal. The physical layer 103 decodes the converted baseband signal. The MAC layer 104 controls the flow of data packets and prevents data packet collisions between the USB control system 300 at the host 510 and the USB control system 300 at the client 520.

Referring to FIG. 3, the application layer 200 includes a controller 210, a channel searching unit 220, a lookup table 230, a switching unit 240, a data converting unit 250, and a frequency allocating unit 260.

The controller 210 receives a control signal OCS from the host controller 410 for driving the USB control system 300, and outputs first to fourth control signals CS1, CS2, CS3 and CS4 for controlling each of the channel searching unit 220, the switching unit 240, the data converting unit 250, and the frequency allocating unit 260, respectively, based on the received control signal OCS.

The channel searching unit 220 operates in response to the first control signal CS1 of the controller 210 and searches for wireless USB modules at the client 520. For example, the channel searching unit 220 at the host 510 receives channel information CI, which includes the number of wireless USB modules at the client 520, with reference to the lookup table 230 at the client 520 through the channel searching unit 220 at the client 520. The channel searching unit 220 at the host 510 selects one of the plurality of wireless USB modules 100_1 to 100_N at the host 510 and receives channel information CI from the client 520 through the selected wireless USB module.

The channel searching unit 220 at the host 510 compares the channel information CI of the client 520 with base information stored in the lookup table 230 at the host 510 to select an available wireless USB module for wireless communication. Information relating to the available wireless USB module (hereinafter referred to as channel selection information (CSI)) is provided to the controller 210 and the controller 210 outputs the second to fourth control signals CS2, CS3 and CS4 for controlling the switching unit 240, the data converting unit 250, and the frequency allocating unit 260, respectively, based on the channel selection information CSI.

The controller 210 transmits the second control signal CS2 to the switching unit 240 to enable a switching operation at the switching unit 240 based on the number of selected wireless USB modules 100_1 to 100_N.

The data converting unit 250 receives serial data S-DATA from the host controller 410 and parses the received serial data S-DATA in response to the third control signal CS3 received from the controller 210. The data converting unit 250 parses the received serial data into N groups, corresponding to the N wireless USB modules searched by the controller 210, and converts the parsed data into parallel data P-DATA. The converted parallel data P-DATA is provided to the switching unit 240. The switching unit 240 is connected to the N wireless USB modules 100_1 to 100_N and performs a switching operation on the N wireless USB modules 100_1 to 100_N in response to the second control signal CS2. For example, the switching unit 240 may set the N wireless USB modules 100_1 to 100_N to a transmitting mode or a receiving mode. Setting the N wireless USB modules 100_1 to 100_N to the transmitting mode results in the N wireless USB modules 100_1 to 100_N transmitting the P-DATA to the client 520. Setting the N wireless USB modules 100_1 to 100_N to the receiving mode results in the N wireless USB modules 100_1 to 100_N receiving the P-DATA from the data converting unit 250. The second control signal CS2 may include N switching signals. When the N wireless USB modules 100_1 to 100_N are selected by the N switching signals, the parallel data P-DATA is transmitted to the selected wireless USB module.

The frequency allocating unit 260 allocates different frequency bands to the N wireless USB modules 100_1 to 100_N to prevent data collision between the N wireless USB modules 100_1 to 100_N. For example, the frequency allocating unit 260 may allocate different time frequency codes (TFCs) from among a plurality of predetermined TFCs to the N wireless USB modules 100_1 to 100_N in response to the fourth control signal CS4.

A method of allocating different frequency bands to the N wireless USB modules 100_1 to 100_N will be described with reference to FIGS. 5-8.

Upon supplying the parallel data P-DATA to the N wireless USB modules 100_1 to 100_N, the N wireless USB modules 100_1 to 100_N transmit the parallel data P-DATA to the N wireless USB modules 100_1 to 100_N at the client 520. The parallel data P-DATA may be transmitted through different frequency bands. The USB control system 300 at the client 520 converts the parallel data P-DATA into serial data S-DATA and transmits the serial data S-DATA to the client controller 420.

Once the parallel data P-DATA is received at the client 520, the received parallel data P-DATA is supplied to the data converting unit 250 through the switching unit 240. The data converting unit 250 converts the received parallel data P-DATA into serial data S-DATA and transmits the converted serial data S-DATA to the host controller 410.

The N wireless USB modules 100_1 to 100_N transmit and receive data simultaneously through different frequency bands. As a result, the data transfer rate can be improved in comparison to a structure using a single wireless USB module. For example, when the N wireless USB modules 100_1 to 100_N are used, the USB control system 300 has a data transfer rate that is N times faster than a USB control system having a single wireless USB module. Accordingly, in an exemplary embodiment, the data transfer rate of the USB control system 300 can be increased to more than about 1 Gbps.

According to the current ultra wide band (UWB) standard, a maximum of 14 frequency bands are used. However, because the number of frequency bands used in different countries varies, the USB control system 300 can be adjusted according to the number of available frequency bands.

Figure 4:
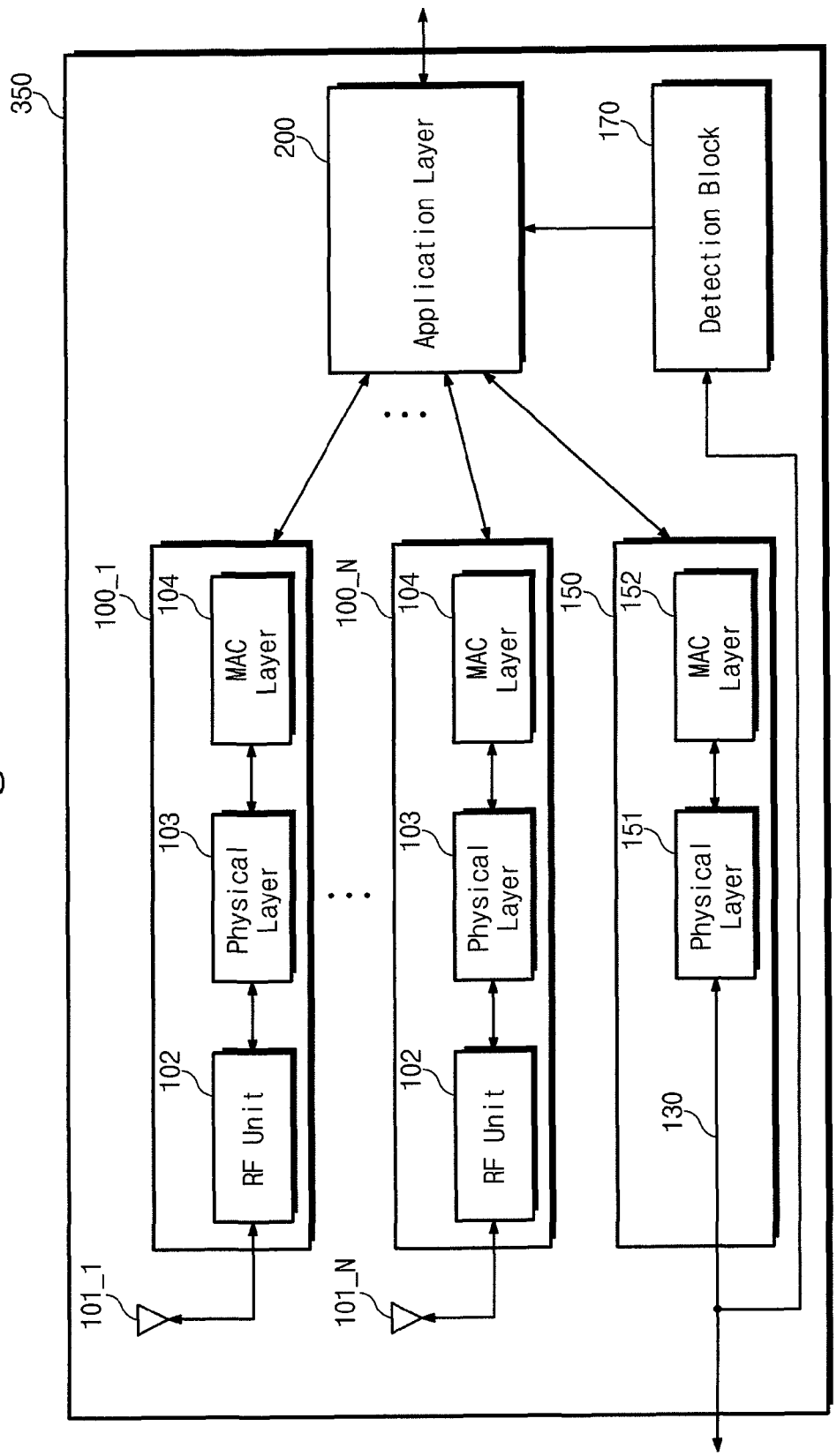
FIG. 4 is a block diagram of a USB control system according to an exemplary embodiment of the inventive concept.

FIG. 4 is a block diagram of a USB control system according to an exemplary embodiment of the inventive concept. Like reference numbers refer to like elements in FIGS. 2 and 4.

Referring to FIG. 4, a USB control system 350 according to an exemplary embodiment of the inventive concept includes N antennas 101_1 to 101_N, N wireless USB modules 100_1 to 100_N corresponding to the N antennas 101_1 to 101_N, respectively, a USB cable 130, a wired USB module 150, a detection block 170, and an application layer 200. Because the USB control system 350 in the host 510 and the client 520 have the same configuration, only the USB control system 350 at the host 510 will be described herein.

The USB cable 130 at the host 510 connects to the USB cable 130 at the client 520 to transmit and receive data through a wire. The wired USB module 150 processes data received through the USB cable 130 and transmits the processed data to the application layer 200. Additionally, the wired USB module 150 transmits data, which is to be transmitted from the host controller 410 to the USB control system 350 at the client 520, to the USB cable 130.

As shown in FIG. 4, the wired USB module 150 includes a physical layer 151 for encoding and decoding data received through the USB cable 130, and a MAC layer 152 for controlling the flow of data packet and preventing data packet collision between the USB control system 350 at the host 510 and the USB control system 350 at the client 520.

In addition, the detection block 170 is connected to the USB cable 130 and detects whether the USB cable 130 at the host 510 is connected to the USB cable at the client 520. The detection block 170 transmits a detection signal corresponding to the detection result to the application layer 200. As shown in FIG. 3, the controller 210 of the application layer 200 controls the switching unit 240 in response to the detection signal received from the detection block 170. Accordingly, the switching unit 240 may configure the N wireless USB modules in response to the second control signal CS2, and configure the wired USB module 150 in response to the detection signal.

When the USB cable 130 at the host 510 is connected to a USB cable at the client 520, the application layer 200 determines whether the wired USB module 150 and the N wireless USB modules 100_1 to 100_N are both used to transmit data. Using the wired USB module 150 and the N wireless USB modules 100_1 to 100_N together to transmit data may increase the data transfer rate.

In an exemplary embodiment, although the USB cable 130 at the host 510 is connected to the USB cable at the client 520, the application layer 200 may determine that only the N wireless USB modules 100_1 to 100_N are to be used to transmit data. When the USB cable 130 at the host 510 is not connected to the USB cable at the client 520, the application layer 200 may determine that only the N wireless USB modules 100_1 to 100_N are to be used to transmit data.

Figure 5:
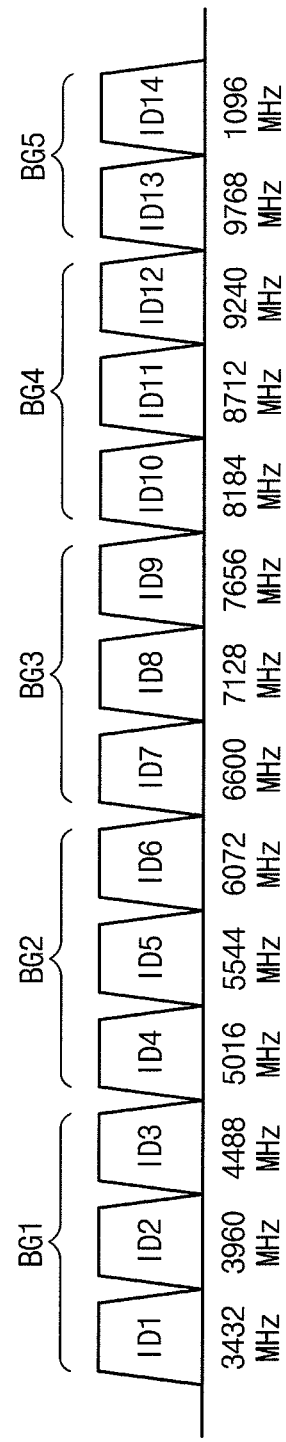
FIG. 5 is a view illustrating a frequency region according to an ultra wide band (UWB) standard.

FIG. 5 is a view illustrating a frequency region according to a UWB standard. FIG. 6A illustrates a first table of a TFC with respect to a first band group. FIG. 6B illustrates a second table of a TFC with respect to a second band group.

Referring to FIG. 5, a wireless universal serial bus (WUSB) standard and a UWB standard including a frequency region from about 3.1 GHz to about 10.6 GHz is implemented, according to an exemplary embodiment of the inventive concept.

According to the UWB standard, a frequency region ranges from about 3.1 GHz to about 10.6 GHz, and is divided into 14 frequency bands ID1 to ID14. A frequency interval of about 528 MHz exists between center frequencies of adjacent frequency bands.

The 14 frequency bands ID1 to ID14 are grouped into five band groups BG1 to BG5. A first band group BG1 includes first to third frequency bands ID1, ID2 and ID3. A second band group BG2 includes fourth to sixth frequency bands ID4, ID5 and ID6. A third band group BG3 includes seventh to ninth frequency bands ID7, ID8 and ID9. A fourth band group BG4 includes tenth to twelfth frequency band ID10, ID11 and ID12. A fifth band group BG5 includes thirteenth to fourteenth frequency bands ID13 and ID14.

The table in FIG. 6A illustrates TFCs with respect to the first band group BG1 and corresponding frequency band IDs. TFCs 1 to 10 and a hopping sequence assigned to each TFC are shown. For example, hopping is performed in an order of the first, second, and third frequency bands ID1, ID2 and ID3 in a TFC1, and hopping is performed in an order of the first, third, and second frequency bands ID1, ID3 and ID2 in a TFC2.

The table in FIG. 6B illustrates TFCs with respect to the second band group BG2 and corresponding frequency band IDs. A hopping sequence similar to the sequence in FIG. 6A is shown.

The application layer 200 shown in FIG. 4 allocates different TFCs to the N wireless USB modules 100_1 to 100_N, allowing the N number of wireless USB modules 100_1 to 100_N to transmit data simultaneously.

Figure 7:
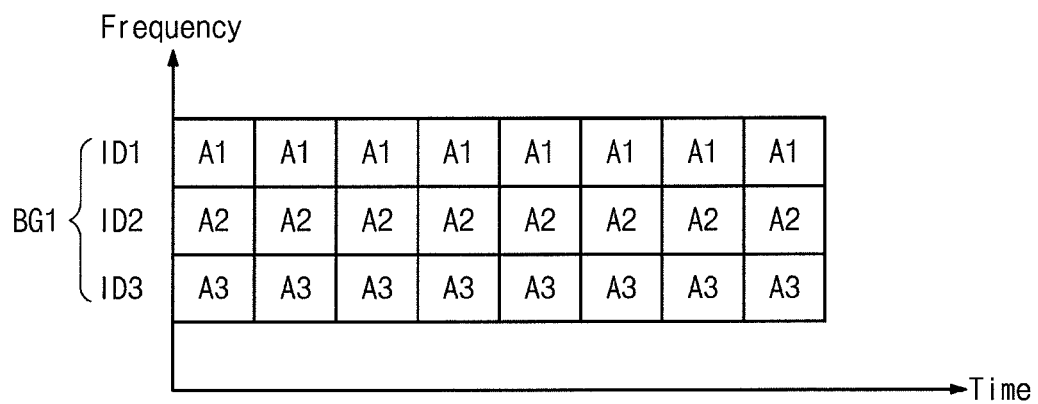
FIG. 7 is a view illustrating first to third frequency band usage configurations according to a time interval.

In an exemplary embodiment of the inventive concept, the application layer 200 may use three wireless modules A1, A2, and A3, as shown in FIG. 7. Time-frequency codes TFC5, TFC6 and TFC7 of the first band group BG1, as shown in FIGS. 6A and 6B, may be allocated to the first to third wireless USB modules A1, A2 and A3, respectively. Accordingly, because the first to third frequency bands ID1, ID2 and ID3 are allocated to TFC5, TFC6 and TFC7, respectively, the first wireless USB module A1 transmits data using the first frequency band ID1, the second wireless USB module A2 transmits data using the second frequency band ID2, and the third wireless USB module A3 transmits data using the third frequency band ID3.

Figure 8:
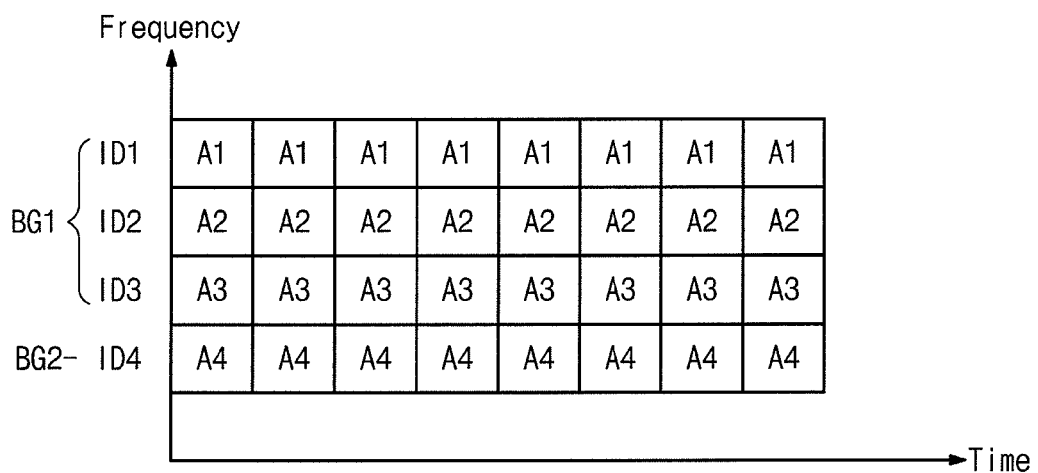
FIG. 8 is a view illustrating first to fourth frequency band usage configurations according to a time interval.

In an exemplary embodiment, the application layer 200 may use four wireless USB modules A1, A2, A3 and A4, as shown in FIG. 8. Time-frequency codes TFC5, TFC6, and TFC7 of the first band group BG1, as shown in FIGS. 6A and 6B, may be allocated to the first to third wireless USB modules A1, A2 and A3, respectively, and time-frequency code TFC4 of the second band group BG2 may be allocated to the fourth wireless USB module A4.

Allocating different frequency bands to the N wireless USB modules 100_1 to 100_N can prevent data collision between the N wireless USB modules 100_1 to 100_N when data is transmitted using the N wireless USB modules 100_1 to 100_N.

In an exemplary embodiment, time-frequency codes TFC1, TFC2 and TFC3 of the first band group BG1 may be allocated to the first to third wireless USB modules A1, A2 and A3. The first to third wireless USB modules A1, A2 and A3 may hop a frequency band according to a hopping sequence assigned to each of TFC1, TFC2 and TFC3. Accordingly, when TFC1, TFC2, and TFC3 are assigned to the first to third wireless USB modules A1, A2 an A3, respectively, data loss of about 30% may occur due to data collision, however, the data transmission distance may be increased as a result of the frequency band hops.

If an environment of a frequency band such as, for example, the first frequency band ID1 is poor, the data transfer rate of the first wireless USB module A1 using the first frequency band ID1 may be lower than other wireless USB modules, or a number of re-transmission requests may be delivered from the client 520. To compensate for the low data transfer rate of the first wireless USB module A1, the application layer 200 may allocate another frequency band or another TFC to the first wireless USB module A1. The frequency band or TFC allocated to the first wireless USB module A1 by the application layer 200 is a frequency band or a TFC different from the frequency band or the TFC allocated to adjacent wireless USB module in use.

Figure 9:
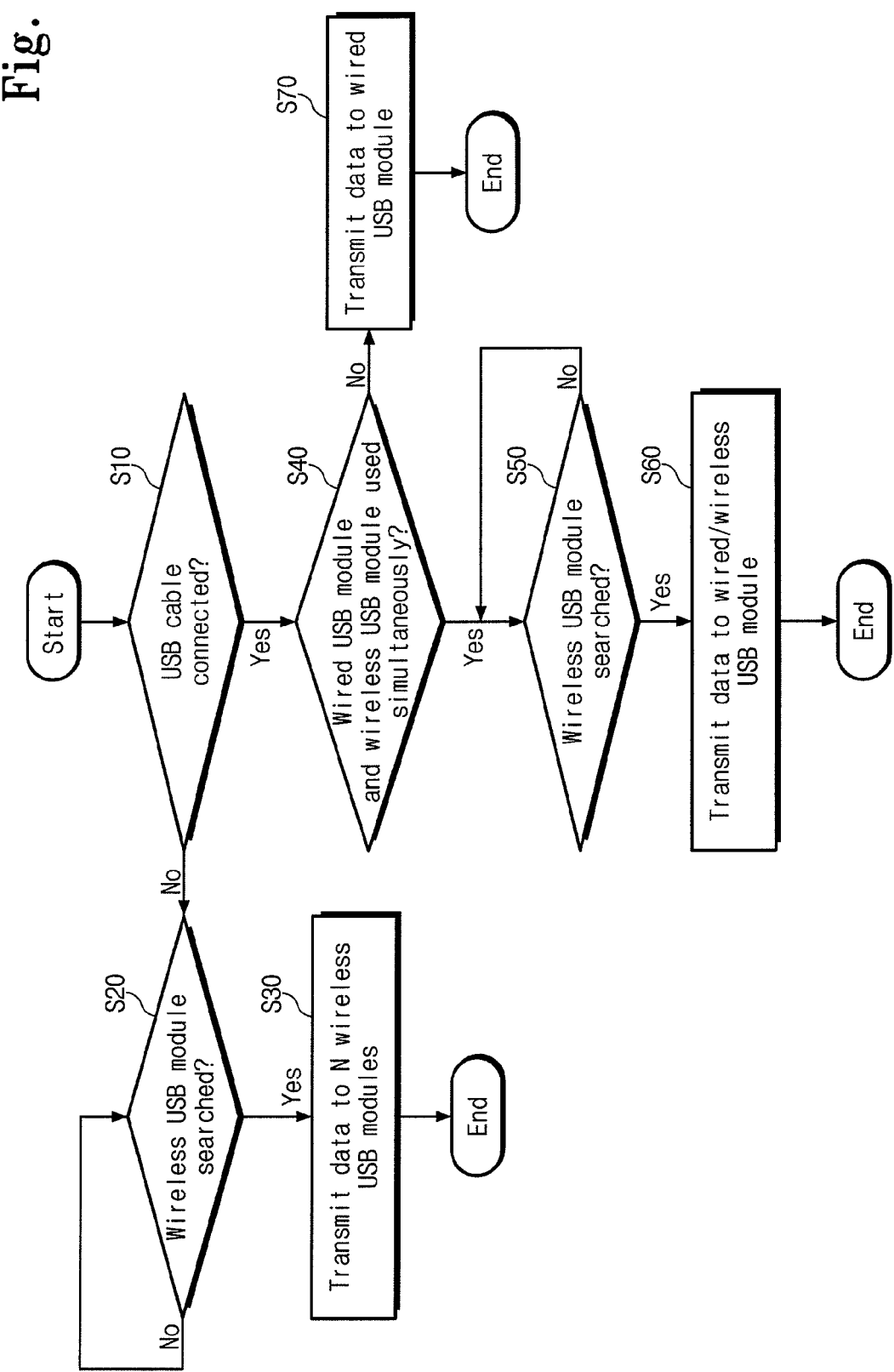
FIG. 9 is a flowchart illustrating a driving method of the USB control system of FIG. 4.

FIG. 9 is a flowchart illustrating a driving method of the USB control system of FIG. 4.

Referring to FIGS. 4 and 9, the application layer 200 of the USB control system 350 at the host 510 determines whether the USB cable 130 at the host 510 is connected to the USB cable at the client 520 at operation S10. For example, the application layer 200 receives a detection signal from the detection block 170. The application layer 200 determines whether the USB cable 130 at the host 510 is connected to the USB cable at the client 520 based on the received detection signal.

If the USB cable 130 is not connected, the application layer 200 searches a plurality of wireless USB modules at the client 520 and selects an available USB module from the plurality of detected USB modules at operation S20. The application layer 200 transmits data to the selected available wireless USB modules at operation S30.

If the USB cable 130 is connected at operation S10, it is determined whether the wired USB module 150 and the N wireless USB modules 100_1 to 100_N are simultaneously used at operation S40. If the wired USB module 150 and the N wireless USB modules 100_1 to 100_N are simultaneously used, the application layer 200 searches for wireless USB modules 100_1 to 100_N at the client 520 at operation S50. If wireless USB modules 100_1 to 100_N at the client 520 are detected, the application layer 200 transmits data to the wired USB module 150 and the detected wireless USB modules 100_1 to 100_N at operation S60.

If the wired USB module 150 and the N wireless USB modules 100_1 to 100_N are not simultaneously used, the application layer 200 transmits data to only the wired USB module 130 at operation S60.

Figure 10:
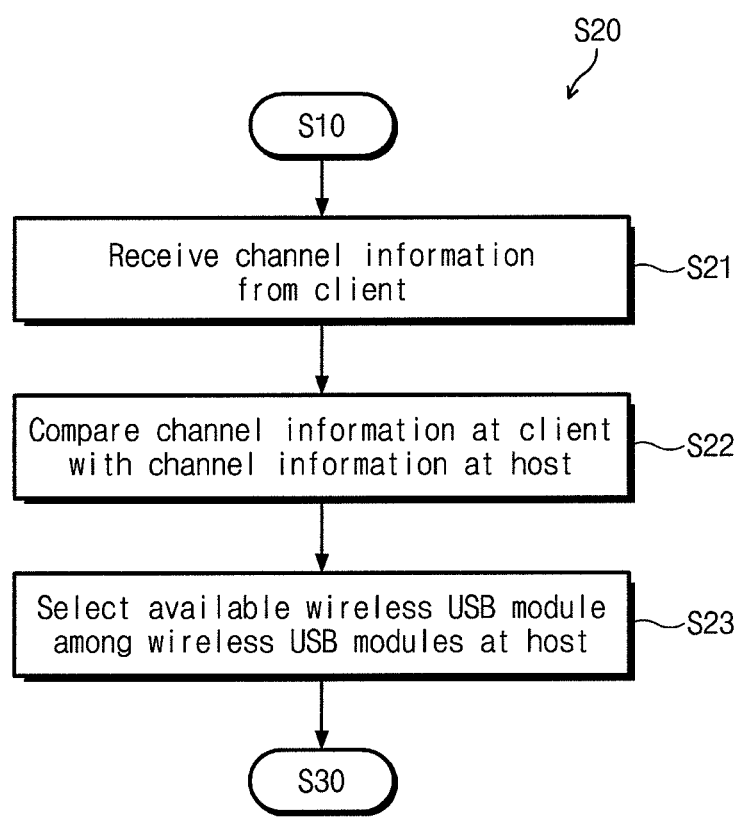
FIG. 10 is a flowchart illustrating operation S20 of FIG. 9.

FIG. 10 is a flowchart illustrating operation S20 of FIG. 9.

Referring to FIGS. 4 and 10, the USB control system 350 at the host 510 searches for wireless USB modules 100_1 to 100_N at the client 520 through the channel searching unit 220. Information such as the number of wireless USB modules 100_1 to 100_N at the client 520 is received with reference to a lookup table 230 at the client 520 at operation S21. The channel searching unit 220 at the host 510 selects one of the wireless USB modules 100_1 to 100_N at the host 510 and receives channel information CI from the client 520 through the selected wireless USB module.

The channel searching unit 220 at the host 510 compares channel information corresponding to the client 520, which is received from the client 520, with channel information corresponding to the host 510, which is pre-stored in the lookup table 230 at the host 510, at operation S22. According to the results of the comparison, an available USB module at the host 510 is selected from the wireless USB modules 100_1 to 100_N to perform wireless communication at operation S23.

Accordingly, if the number of wireless modules at the client 520 is N, the application layer 200 selects the N wireless USB modules 100_1 to 100_N at the host 510 and transmits data to the selected N wireless USB modules 100_1 to 100_N. For example, the wireless USB modules 100_1 to 100_N having the same number as the wireless USB modules in the client 520 are selected.

The above operation is performed at operation S50 of FIG. 9.

Figure 11:
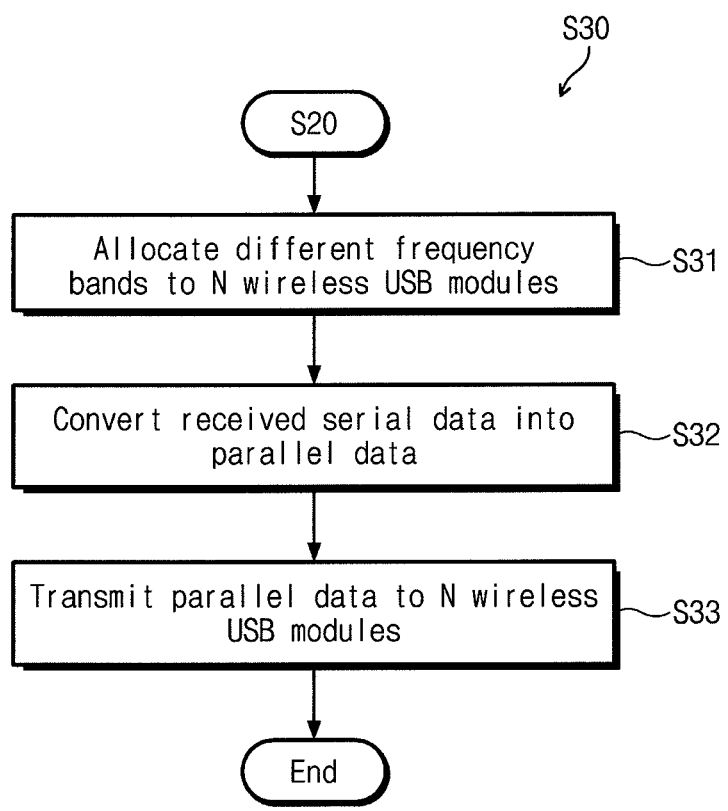
FIG. 11 is a flowchart illustrating operation S30 of FIG. 9.

FIG. 11 is a flowchart illustrating operation S30 of FIG. 9.

Referring to FIGS. 4 and 11, the application layer 200 allocates different frequency bands to the N wireless USB modules 100_1 to 100_N at operation S31. For example, the different TFCs are allocated to the N wireless USB modules 100_1 to 100_N. Additionally, the application layer 200 converts serial data S-DATA, received from the host controller 410 at the host 510, into parallel data P-DATA at operation S32, and transmits the converted parallel data P-DATA to the N wireless USB modules 100_1 to 100_N at operation S33.

According to an exemplary embodiment of the USB control system and a method of driving the same, a plurality of wireless USB modules, to which different frequency bands are respectively allocated, are used simultaneously to transmit data, such that a data transfer rate can be improved in a wireless communication environment.

According to an exemplary embodiment of the USB control system and a method of driving the same, a wired USB module and a plurality of wireless USB modules are utilized simultaneously, such that data transmission can be performed in a wired and wireless communication environment.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A universal serial bus (USB) control system, comprising:
    a plurality of antennas configured to transmit and receive a radio frequency (RF) signal;
    a plurality of wireless USB modules connected to the plurality of antennas, wherein the wireless USB modules are configured to respectively receive different groups of data that form first data via first RF signals received through corresponding antennas while in a receiving mode, and respectively transmit different groups of data that form second data via second RF signals to be transmitted through the corresponding antennas while in a transmitting mode,
    wherein a number of the different groups of data that form the first data is equal to a number of the wireless USB modules, and a number of the different groups of data that form the second data is equal to the number of the wireless USB modules; and
    an application layer connected to the plurality of wireless USB modules,
    wherein the application layer comprises:
    a controller;
    a frequency allocating unit configured to allocate different frequency bands to the plurality of wireless USB modules in response to a first control signal received from the controller;
    a data converting unit configured to convert received serial data into parallel data and convert received parallel data into serial data in response to a second control signal received from the controller;
    a switching unit configured to set the plurality of wireless USB modules to the transmitting mode or the receiving mode, wherein the plurality of wireless USB modules are configured to transmit the parallel data to a client device while in the transmitting mode, and receive the parallel data from the data converting unit while in the receiving mode;
    a lookup table configured to store reference channel information corresponding to the plurality of wireless USB modules; and
    a channel searching unit configured to receive channel information from a client device, and output channel selection information by comparing the channel information with the reference channel information,
    wherein the controller is configured to select available wireless USB modules from the plurality of wireless USB modules based on the channel selection information.

2. The USB control system of claim 1, wherein the frequency allocating unit is configured to allocate different time-frequency codes (TFCs) to the plurality of wireless USB modules.

3. The USB control system of claim 1, wherein the data converting unit is configured to parse the received serial data into a number of groups corresponding to the plurality of wireless USB modules.

4. The USB control system of claim 1, wherein each of the plurality of wireless USB modules comprises:
    an RF unit connected to the corresponding antenna, wherein the RF unit is configured to convert the first and second RF signals into a baseband signal;

a physical layer configured to encode and decode the baseband signal; and a media access control (MAC) layer configured to control a flow of the first and second data.

5. The USB control system of claim 1, further comprising:
a USB cable configured to transmit and receive third data;
a wired USB module configured to process the third data received through the USB cable, transmit the processed third data to the application layer, and transmit the processed third data to the USB cable; and
a detection block connected to the USB cable configured to detect a connection state of the USB cable and transmit a detection signal to the controller.

6. The USB control system of claim 4, wherein the MAC layer is configured to prevent data packet collision.

7. The USB control system of claim 5, wherein the application layer is configured to determine whether to transmit the third data through the USB cable in response to the detection signal received from the detection block.

8. The USB control system of claim 5, wherein the wired USB module comprises:
a physical layer configured to encode and decode the third data and
a media access control (MAC) layer configured to control a flow of the third data.

9. The USB control system of claim 8, wherein the MAC layer is configured to prevent data collision.

10. A universal serial bus (USB) control system, comprising:
a plurality of antennas configured to transmit and receive a radio frequency (RF) signal;
a plurality of wireless USB modules connected to the plurality of antennas, wherein each wireless USB module is configured to convert the RF signal received through a corresponding antenna into data, convert the data into the RF signal, and transmit the RF signal through the corresponding antenna; and
an application layer connected to the plurality of wireless USB modules, wherein the application layer comprises:
a controller;
a frequency allocating unit configured to allocate different frequency bands to the plurality of wireless USB modules in response to a first control signal received from the controller;
a data converting unit configured to convert received serial data into parallel data and convert received parallel data into serial data in response to a second control signal received from the controller;
a switching unit configured to set the plurality of wireless USB modules to a transmitting mode or a receiving mode, wherein the plurality of wireless USB modules are configured to transmit the parallel data to a client device while in the transmitting mode, and receive the parallel data from the data converting unit while in the receiving mode;
a lookup table configured to store reference channel information corresponding to the plurality of wireless USB modules; and
a channel searching unit configured to receive channel information from a client device, and output channel selection information by comparing the channel information with the reference channel information,
wherein the controller is configured to select available wireless USB modules from the plurality of wireless USB modules based on the channel selection information.

11. The USB control system of claim 10, wherein the frequency allocating unit is configured to allocate different time-frequency codes (TFCs) to the plurality of wireless USB modules.

12. The USB control system of claim 10, wherein the data converting unit is configured to parse the received serial data into a number of groups corresponding to the plurality of wireless USB modules.

13. The USB control system of claim 10, wherein each of the plurality of wireless USB modules comprises:
an RF unit connected to the corresponding antenna, wherein the RF unit is configured to convert the RF signal into a baseband signal;
a physical layer configured to encode and decode the baseband signal; and
a media access control (MAC) layer configured to control a flow of the data.

14. The USB control system of claim 10, further comprising:
a USB cable configured to transmit and receive data;
a wired USB module configured to process the data received through the USB cable, transmit the processed data to the application layer, and transmit the processed data to the USB cable; and
a detection block connected to the USB cable configured to detect a connection state of the USB cable and transmit a detection signal to the controller.

* * * * *